United States Patent
Guryev

(10) Patent No.: US 12,527,743 B2
(45) Date of Patent: Jan. 20, 2026

(54) SYSTEMS FOR VACUUM MEDIATED LIPOSOME PREPARATION, AND METHODS FOR USING THE SAME

(71) Applicant: Becton, Dickinson and Company, Franklin Lakes, NJ (US)

(72) Inventor: Oleg Guryev, Santa Clara, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 533 days.

(21) Appl. No.: 18/135,387

(22) Filed: Apr. 17, 2023

(65) Prior Publication Data

US 2023/0364018 A1    Nov. 16, 2023

Related U.S. Application Data

(60) Provisional application No. 63/340,091, filed on May 10, 2022.

(51) Int. Cl.
*A61K 9/1277*    (2025.01)

(52) U.S. Cl.
CPC .................. *A61K 9/1277* (2013.01)

(58) Field of Classification Search
CPC ............. A61K 9/1277; A61K 9/1272
See application file for complete search history.

(56) References Cited

U.S. PATENT DOCUMENTS

| | | | |
|---|---|---|---|
| 4,737,323 A | 4/1988 | Martin et al. | |
| 5,833,860 A | 11/1998 | Kopaciewicz et al. | |
| 6,544,417 B1 | 4/2003 | Tortorella | |
| 6,623,671 B2 | 9/2003 | Coe et al. | |
| 10,556,216 B2 * | 2/2020 | Guryev | A61K 9/1277 |
| 10,736,847 B2 | 8/2020 | Guryev et al. | |
| 2006/0034907 A1 | 2/2006 | Nagaike et al. | |
| 2021/0190790 A1 | 6/2021 | Mehrpouyan et al. | |

FOREIGN PATENT DOCUMENTS

| | | |
|---|---|---|
| EP | 0321064 | 6/1989 |
| EP | 0460720 | 8/1996 |
| KR | 20110105666 | 9/2011 |

OTHER PUBLICATIONS

Merck: "Filters and Supporting Hardware", Dec. 14, 2019 pp. 1-24, XP093303740, Retrieved from the Internet: URL: https://www.sigmaaldrich.com/deepweb/assets/sigmaaldrich/marketing/global/documents/138/606/filters-hardware-catalog-ca5563en-ms.pdf?srsltid=AfmBOoo2UwT_bm3TdgDi65a8wJddYQBLv4pZyriTQsXW23KVZ6jtpBNH.

(Continued)

*Primary Examiner* — Thuan D Dang
(74) *Attorney, Agent, or Firm* — Bret E. Field; Bozicevic, Field & Francis LLP

(57) ABSTRACT

Liposome preparation systems are provided. Aspects of the systems include a liposome collection container and a membrane holder. In embodiments, the liposome collection container has an open first end, a closed bottom, a wall, and an opening in the wall. The system can be operably connected to a vacuum source such that a vacuum force can be applied through the opening, thereby drawing liposomes through the porous membrane and producing a population of liposomes. Also provided are methods of producing liposomes, as well as apparatus and kits for performing the methods.

20 Claims, 4 Drawing Sheets

(56) References Cited

OTHER PUBLICATIONS

Chen, et al. "Screening of permeable compounds in Flos Lonicerae Japonicae with liposome using ultrafiltration and HPLC", Journal of Pharmaceutical and Biochemical Analysis. Elsevier B.V, Amsterdam, NL, 1-13, vo 1 • 54, No. 2 , 2011, pp. 406-419.
Dipali, et al. "Comparative Study of Separation of Non-encapsulated Drug from Unilamellar Liposomes by Various Methods", Journal of Pharmacy and Pharmacology, vol. 48, No. 11, 1996, pp. 1112-111.
Communication pursuant to Rule 164 (1) EPC for European Patent Application No. 17803202.5, mailed Oct. 16, 2019, 11 pages.
Akbarzadeh et al. "Liposome: classification, preparation, and applications," Nanoscale Research Letters, vol. 8, 2013, 102 (9 pages).
Fujii et al. "Liposome display for in vitro selection and evolution of membrane proteins," Nature Protocols, vol. 9, No. 7, 2014, pp. 1578-1591.
Guven et al. "Rapid and efficient method for the size separation of homogeneous fluorescein-encapsulating liposomes," Journal of Liposome Research, vol. 19, No. 2, 2009, pp. 148-154.
Hope et al. "Production of large unilamellar vesicles by a rapid extrusion procedure. Characterization of size distribution, trapped volume and ability to maintain a membrane potential," Biochimica et Biophysica Acta, vol. 812, 1985, pp. 55-65.
Hope et al. "Chapter 8: Reduction of liposome size and preparation of unilamellar vesicles by extrusion techniques," Liposome Technology, 2nd Edition. G. Gregoriadis, Ed., CRI Press, Boca Raton, FL, vol. 1, 1993, pp. 124-139.
MacDonald et al. "Small-volume extrusion apparatus for preparation of large, unilamellar vesicles," Biochimica et Biophysica Acta, vol. 1061, 1991, pp. 297-303.
Mayer et al. "Vesicles of variable sizes produced by a rapid extrusion procedure," Biochimica et Biophysica Acta, vol. 858, 1986, pp. 161-168.
Olson et al. "Preparation of liposomes of defined size distribution by extrusion through polycarbonate membranes," Biochimica et Biophysica Acta, vol. 557, 1979, pp. 9-23.
Sigma-Aldrich, Product description of Microcon® centrifugal filter unit from Sigma Aldrich (https://www.sigmaaldrich.com/catalog/product/sigma/z648051?lang=en&region=US), 2019, 3 pages.
Ganeshnarayan, et al "Poly-N-Acetylglucosamine Matrix Polysaccharaide Impedes Fluid Convection and Transport of the Cationic Surfactant Cetylpyridinium Chloride through Bacterial Biofilms", Applied and Env. Microbio. Mar. 2009, 1308-1314.
Morton, et al. "Constant pressure-controlled extrusion method for the preparation of Nano-sized lipid vesicles", J Vis Exp. 2012, (64):4151, 17 pages.
Guo, et al. "Nanomaterial Preparation by Extrusion through Nanoporous Membranes", Small. May 2018; 14(18):e1703493, 16 pages.
Šturm, et al. "Basic Methods for Preparation of Liposomes and Studying Their Interactions with Different Compounds, with the Emphasis on Polyphenols", Int J Mol Sci. Jun. 2021; 22(12): 6547.

* cited by examiner

Membrane Holder with O-Ring

Liposome Collection Container with O-Ring

System with Membrane Holder, Liposome Collection Container, and Two O-Rings

Size determination of liposomes by Dynamic Light Scattering (DLS) analysis after preparation with 400 nm membranes Size determination of liposomes by Dynamic Light Scattering (DLS) analysis after preparation with 200 nm membranes

SYSTEMS FOR VACUUM MEDIATED LIPOSOME PREPARATION, AND METHODS FOR USING THE SAME

CROSS-REFERENCE TO RELATED APPLICATION

Pursuant to 35 U.S.C. § 119 (e), this application claims priority to the filing date of U.S. Provisional patent application Ser. No. 63/340,091 filed May 10, 2022; the disclosure of which application is incorporated herein by reference in its entirety.

INTRODUCTION

Liposomes are spherical vesicles that have one or multiple lipid bilayers. Liposomes that include a single lipid bilayer may be referred to as unilamellar liposomes, whereas liposomes that include multiple lipid bilayers may be referred to as multilamellar vesicles. Liposomes can be prepared using different methods, which may depend on factors, such as the lipid composition of the lipid bilayer of the liposomes, the type of medium in which the lipid vesicles are dispersed, the desired size of the liposomes, the desired polydispersity of the liposomes, the robustness and batch-to-batch reproducibility of the production method, and other factors, such as the intended use of the resulting liposomes. For example, liposomes may contain a substance, such as a drug, and be used to deliver the substance to a target area in a patient. Thus, the method used to produce such liposomes may also depend on the physicochemical characteristics of the substance to be entrapped in the liposomes, the concentration of the entrapped substance, or additional processes involved during application/delivery of the liposomes to the patient.

After a suspension of liposomes has been produced, such as a suspension of large, multilamellar vesicles, it may be desirable to produce liposomes having sizes within a certain size range. One common technique for sizing liposomes is extrusion, a process by which large, multilamellar vesicles can be disrupted and downsized by extrusion through a polycarbonate membrane with defined pore size. In currently employed extrusion protocols, phospholipids are first suspended in a buffered saline solution to give large, multilamellar vesicles (LMVs). The vesicles are then repeatedly extruded through a polycarbonate membrane with defined pore size, forced back and forth by specially modified gas-tight syringes attached to the membrane support chamber.

SUMMARY

The inventors have realized that by employing a vacuum device, the membrane extrusion procedure can be substantially improved, accelerated and simplified. Instead of special glass gas-tight syringes and metal membrane support chamber, methods of embodiments of the present invention employ plastic components, including membrane holding unit, collection tube and vacuum tube, where the membrane holding unit and collection tube may be disposable. Vacuum devices of embodiments of the present invention save time and money by eliminating glass and metal liposome making extrusion device, supporting filters and polycarbonate membranes, and eliminating time for assembling and disassembling such devices. Switching from a special extrusion device to a disposable unit eliminates after work cleaning and the possibility of cross-contamination between liposome samples.

Systems for producing a population of liposomes are provided. Aspects of the systems include a liposome collection container and a membrane holder. In embodiments, the liposome collection container has an open first end, a closed bottom, a wall, and an opening in the wall. The system can be operably connected to a vacuum source such that a vacuum force can be applied through the opening, thereby drawing liposomes through the porous membrane and producing a population of liposomes. Also provided are methods of producing liposomes, as well as apparatus and kits for performing the methods.

DETAILED DESCRIPTION

Figure 1A:
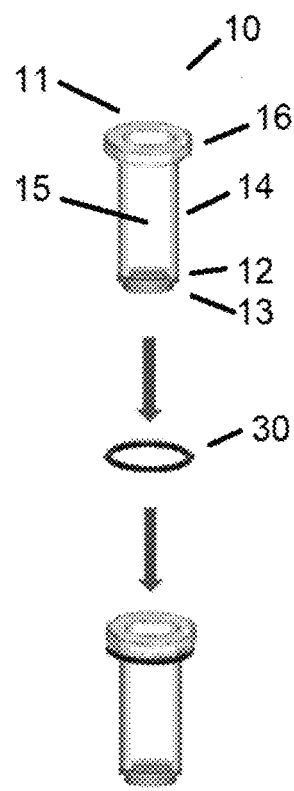
FIG. 1A shows a membrane holder and an O-ring, in accordance with an embodiment of the invention.

Systems for producing a population of liposomes are provided. Aspects of the systems include a liposome collection container and a membrane holder. In embodiments, the liposome collection container has an open first end, a closed bottom, a wall, and an opening in the wall. The system can be operably connected to a vacuum source such that a vacuum force can be applied through the opening, thereby drawing liposomes through the porous membrane and producing a population of liposomes. Also provided are methods of producing liposomes, as well as apparatus and kits for performing the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Producing Liposomes

Provided are methods for producing a population of liposomes. For example, the method can include providing a liposome extrusion system that includes a liposome collection container and a membrane holder. The liposome collection container includes an open first end and a closed bottom separated by a wall that collectively define an interior. The collection container also has an opening in the wall. The membrane holder has an open first end and a porous membrane at a second end separated by a wall that collectively define a liposome suspension holding volume, i.e., and interior of the collection container. The membrane holder is positioned such that the porous membrane is located in the interior of the liposome collection container.

The method can further include the step of introducing a liposome suspension into the liposome suspension holding volume. As such, the liposome suspension can be in contact with the porous membrane, e.g., a top side of the porous membrane. Thereafter, a vacuum force can be applied through the opening in the wall of the liposome collection container such that the liposomes are drawn through the porous membrane into the interior of the collection container and produce the population of liposomes. Stated in another manner, the vacuum force can be transmitted from the opening in the wall of the collection container to the interior of the collection container, wherein the porous membrane is located in the interior of the collection container. As such, the vacuum force can be exerted through the pores of the porous membrane, thereby drawing the liposomes through the pores of the porous membrane. As the liposomes traverse the membrane, the liposomes pass through the pores in the porous membrane to produce the population of liposomes.

In some cases providing the system includes placing the second end of the membrane holder into the interior of the liposome collection container. As such, the porous membrane at the second end of the membrane holder is also positioned in the interior of the liposome collection container. Thus, the liposome suspension holding volume of the membrane holder is in fluid communication with the interior of the liposome collection container through the porous membrane. By "fluid communication" is meant that a fluid (e.g., a gas or a liquid, including a suspension of liposomes) is able to flow from one area to another area. For example, in a liposome extrusion system disclosed herein, a fluid may flow from the liposome suspension holding volume of the membrane holder to the interior of the liposome collection container through the porous membrane.

In some cases, the opening in the wall of the liposome collection container is located above the porous membrane. As such, when the liquid of the liposome suspension is drawn through the porous membrane with the vacuum force, the amount of liquid that exits the liposome collection container through the opening can be minimized or eliminated. In other words, by positioning the opening above the membrane, liquid is inhibited from being accidentally aspirated into the opening as easily, thereby reducing loss of liquid to outside the container. In some instances, the opening in the wall is oriented perpendicular to the porous membrane. For instance, the porous membrane can be oriented horizontally whereas the opening can be positioned on a vertical or near-vertical wall of the collection container. In some instances, the opening is oriented within 30° of vertical or less, such as 15° or less or 5° or less.

In some instances, the membrane holder is oriented such that the porous membrane is located directly below the open first end. Stated in another manner, the membrane holder is oriented such that a vertical line exists that intersects both the open first end and the porous membrane.

In addition, in some embodiments the volume of the liposome collection container below the porous membrane is greater than the liposome suspension holding volume. As such, even if the liposome suspension holding volume is completely filled with a liposome suspension liquid, then the volume of liquid will not be sufficient to rise to the level of the opening and overflow out of the liposome collection container. In some cases the volume of the liposome collection container below the porous membrane can exceed than the liposome suspension holding volume by 5% or more, such as by 20% or more or by 50% or more. Such relative volumes can reduce the chance that liquid will overflow into the opening, e.g. when a user handles the system.

In certain embodiments, the suspension of liposomes may be introduced into the liposome extrusion system such that the suspension of liposomes is positioned on one side of the membrane. For example, the suspension of liposomes may be contained in the liposome suspension holding volume, which is positioned on one side of the membrane. During production of the population of liposomes, the suspension of liposomes may traverse from one side of the membrane, through the porous membrane, and to the other side of the membrane. For instance, the suspension of liposomes may be contained initially in the liposome suspension holding volume on a first side of the membrane and then, during production of the population of liposomes, may traverse the porous membrane to be contained in the interior of the liposome collection container on the other side of the membrane.

In certain aspects, the suspension of liposomes is introduced into the liposome extrusion system using any convenient liquid handling technique. For example, a volume of the suspension of liposomes may be added to the liposome extrusion system using any convenient liquid handling apparatus, such as, but not limited to, a syringe, a needle, a pipette, an aspirator, among other liquid handling devices.

In some embodiments one or both of the membrane holder and the liposome collection container can have a circular cross section. In some instances, both of such elements have a circular cross section. Furthermore, the membrane holder and liposome collection container can be positioned such that the circular cross section of the membrane holder is coaxial with the circular cross section of the liposome collection container. In other words, each circular cross section can have a center of the circle wherein the axis is located perpendicular to the cross section and intersects the center of the circle.

In some cases the system further includes a sealing element that seals the membrane holder to the liposome collection container. The seal between such elements can be liquid-tight, gas-tight, or both. As used herein, "liquid-tight" means that a liquid does not substantially leak through a connection between elements whereas "gas-tight" means that a gas does not substantially leak through a connection between the elements. In some embodiments the sealing element is a gasket, e.g., an O-ring, that seals the membrane holder to the liposome collection container.

Applying a vacuum force to the suspension of liposomes in the liposome suspension holding volume can draw the liposomes through the porous membrane. In some cases the vacuum force is generated by a vacuum source such as a vacuum ejector, a rotary vane pump, a diaphragm pump, a liquid-ring pump, a reciprocating compressor, a scroll compressor, and a lobe pump. For instance, a vacuum ejector uses the Venturi effect to create a vacuum due to the flow of a fluid, wherein vacuum ejectors are also sometimes referred to as aspirators. The vacuum force depends on the difference in pressure between the vacuum source and the atmosphere surrounding the apparatus. Atmospheric pressure depends on several factors including altitude, temperature, and weather. The average atmospheric pressure at sea level is about 101 kPa, but it can also vary to higher or lower values, such as up to about 105 kPa at certain locations on Earth during certain weather events. In some cases the atmospheric pressure during the method is approximately 101 kPa, and thus the vacuum force has a magnitude of less than approximately 101 kPa. In some cases, the magnitude of the vacuum force can range from 0.1 kPa to 105 kPa, e.g., from 0.1 kPa to 101 kPa, from 0.1 kPa to 100 kPa, from 10 kPa to 100 kPa, from 25 kPa to 100 kPa, from 50 kPa to 95 kPa, or from 70 kPa to 90 kPa. The vacuum can also be described by the pressure inside the vacuum source. In some cases, the vacuum source pressure ranges from 100 kPa to 0.1 kPa, which can be referred to herein as rough vacuum or low vacuum. For example, the vacuum source pressure can range from 95 kPa to 0.5 kPa, such as from 90 kPa to 1 kPa, from 80 kPa to 2 kPa, from 70 kPa to 3 kPa, from 60 kPa to 4 kPa, or from 50 kPa to 5 kPa. In some embodiments, the vacuum source pressure ranges from 100 Pa to 0.1 Pa, which is referred to herein as fine vacuum or medium vacuum. In other cases, the vacuum source pressure ranges from 0.1 Pa to $10^{-5}$ Pa, which is referred to herein as high vacuum.

In some instances, the system used to perform the method further includes a vacuum adapter, wherein a vacuum force can be transmitted from the vacuum source to the vacuum adapter and then to the opening in the wall of the liposome collection container. In some cases, system is configured such that there is fluid communication between the vacuum source, the vacuum adapter, and the interior of the liposome collection container through the opening of the liposome collection container. The vacuum adapter can have a first opening that is operatively coupled to the vacuum source and a second opening that is operatively coupled to the opening of the liposome collection container, along with a wall of the vacuum adapter that collectively defines an interior of the vacuum adapter.

In some embodiments at least a portion of the liposome collection container is located in an interior of the vacuum adapter. The vacuum adapter can have a circular cross-section, e.g., wherein the circular cross section of the vacuum adapter is coaxial with a circular cross section of the liposome collection container. The system can also include a sealing element that seals the vacuum adapter to collection container. For instance, the sealing element can be a gasket, e.g., an O-ring.

In some cases the introducing and applying steps are repeated in order to draw the liposomes through the membrane one or more additional times. In such cases, the membrane holder can be separated from the liposomes collection container, e.g., by lifting the membrane holder vertically. After, the liposomes can be withdrawn from the liposomes collection container, e.g., by a user operated or robotically operated pipette, and then dispensed into the liposome suspension holding volume of the membrane holder. The elements can then be positioned such that the porous membrane is located in the interior of the liposome collection container and the vacuum force can be applied again. The introducing and applying steps can be repeated for 1 or more time, such as 2 or more, 3 or more, 4 or more, 6 or more, 8 or more, or 10 or more.

In some embodiments the method further includes transferring the population of liposomes from the liposome collection container into a receiving container. For instance, the membrane holder can be separated from the liposome collection container, e.g., by lifting the membrane holder vertically. Afterwards, the withdrawn from the liposome collection container, e.g., by a user operated or robotically operated pipette, and then dispensed into the receiving container.

Liposomes

In some instances, the population of liposomes produced by the methods is a population of liposomes of defined size. By "defined size" is meant that, because of the manner in which the liposomes are made, the sizes of the various liposomes in the population are known, and specifically the range of liposome sizes in the population is known. In some cases, the liposomes have an average size that is substantially the same. For example, in the case of spherical liposomes, a population of liposomes may have an average diameter that is substantially the same. By "average" is meant the arithmetic mean. Values that are substantially the same include values that vary from each other by 50% or less, such as 45% or less, or 40% or less, or 35% or less, or 30% or less, or 25% or less, or 20% or less, or 15% or less, or 10% or less, or 5% or less, or 3% or less, or 1% or less, or 0.5% or less. In some cases, values that are substantially the same include values that vary from each other by 10% or less. In some cases, values that are substantially the same include values that vary from each other by 5% or less. In some cases, values that are substantially the same include values that vary from each other by 3% or less. In some cases, values that are substantially the same include values that vary from each other by 1% or less. In some cases, values that are substantially the same include values that vary from each other by 0.5% or less. The average size of the liposomes may, in some instances, vary by 50% or less, such as 45% or less, or 40% or less, or 35% or less, or 30% or less, or 25% or less, or 20% or less, or 15% or less, or 10% or less, or 5% or less, or 3% or less, or 1% or less, or 0.5% or less. In some cases, the average size of the liposomes varies by 10% or less. In some cases, the average size of the liposomes varies by 5% or less. In some cases, the average size of the liposomes varies by 3% or less. In some cases, the average size of the liposomes varies by 1% or less. In some cases, the average size of the liposomes varies by 0.5% or less.

In certain embodiments, a population of liposomes may be described by the polydispersity of the liposomes. "Dispersity" or "polydispersity" is a measure of the heterogeneity of sizes of particles in a mixture. In the context of liposomes, polydispersity can range from 0 to 1, where a polydispersity of 0 indicates a monodisperse population of liposomes (e.g., liposomes that have the same average size), and where a polydispersity of 1 indicates a heterogeneous mixture of liposomes. In some cases, the size of liposomes (and thus the polydispersity) can be determined by dynamic light scattering (DLS).

In certain embodiments, methods of the present disclosure are sufficient for producing a population of liposomes from a suspension of liposomes (e.g., an aqueous suspension of liposomes). In some cases, the starting suspension of liposomes includes a population of liposomes having heterogeneous sizes. As such, methods of the present disclosure include starting with a suspension of liposomes (e.g., a population of liposomes having heterogeneous sizes) and producing a population of liposomes from the starting suspension of liposomes. The population of liposomes in the starting suspension of liposomes can also be referred to herein as the initial population of liposomes, i.e., to distinguish such liposomes from the population of liposomes produced by being drawn through the porous membrane.

In some embodiments, the method includes producing a population of liposomes from a suspension of heterogeneous liposomes, where the average size of the resulting population of liposomes varies by 50% or less, such as 45% or less, or 40% or less, or 35% or less, or 30% or less, or 25% or less, or 20% or less, or 15% or less, or 10% or less, or 5% or less, or 3% or less, or 1% or less, or 0.5% or less. In some cases, the method includes producing a population of liposomes from a suspension of heterogeneous liposomes, where the average size of the resulting population of liposomes varies by 10% or less. In some cases, the method includes producing a population of liposomes from a suspension of heterogeneous liposomes, where the average size of the resulting population of liposomes varies by 5% or less. In some cases, the method includes producing a population of liposomes from a suspension of heterogeneous liposomes, where the average size of the resulting population of liposomes varies by 3% or less. In some cases, the method includes producing a population of liposomes from a suspension of heterogeneous liposomes, where the average size of the resulting population of liposomes varies by 1% or less. In some cases, the method includes producing a population of liposomes from a suspension of heterogeneous liposomes, where the average size of the resulting population of liposomes varies by 0.5% or less. In yet other instances, the average size of the disparate liposome members of the population may vary by 50% or more, such as 75% or more, including 100% or more. For instance, the average size of the disparate liposome members in the starting suspension of liposomes may vary by 50% or more, such as 75% or more, including 100% or more.

In some instances, the starting suspension of liposomes has a higher polydispersity as compared to the produced population of liposomes. Thus, methods of the present disclosure are useful for producing a population of liposomes having a polydispersity less than the polydispersity of the starting suspension of liposomes.

In some cases, the polydispersity of the produced population of liposomes is 0.9 or less, such as 0.8 or less, or 0.7 or less, or 0.5 or less, or 0.4 or less, or 0.3 or less, or 0.2 or less, or 0.1 or less, or 0.05 or less, or 0.01 or less. For example, the polydispersity of the produced population of liposomes may be 0.5 or less. In some cases, the polydispersity of the produced population of liposomes may be 0.4 or less. In some cases, the polydispersity of the produced population of liposomes may be 0.3 or less. In some cases, the polydispersity of the produced population of liposomes may be 0.2 or less. In some cases, the polydispersity of the produced population of liposomes may be 0.1 or less. In some cases, the polydispersity of the produced population of liposomes may be 0.05 or less. In some cases, the polydispersity of the produced population of liposomes may be 0.01 or less. In certain instances, the polydispersity of the produced population of liposomes ranges from 0.01 to 0.5, such as 0.01 to 0.4, or 0.01 to 0.3, or 0.01 to 0.2, or 0.01 to 0.1. In other embodiments, the polydispersity of the produced population of liposomes ranges from 0.01 to 0.5, such as 0.05 to 0.5, or 0.1 to 0.5, or 0.1 to 0.4, or 0.1 to 0.3. In other embodiments, the polydispersity of the produced population of liposomes ranges from 0.01 to 0.5, such as 0.05 to 0.5, or 0.1 to 0.5, or 0.2 to 0.5, or 0.2 to 0.4.

In some cases, the polydispersity of the starting suspension of liposomes is 0.5 or more, such as 0.6 or more, or 0.7 or more, or 0.8 or more, or 0.9 or more. In some cases, the polydispersity of the starting suspension of liposomes is 1. For example, the polydispersity of the starting suspension of liposomes may range from 0.5 to 1, such as 0.6 to 1, or 0.7 to 1, or 0.8 to 1, or 0.9 to 1.

In some instances, the starting suspension of liposomes includes liposomes having sizes larger than the produced population of liposomes. In some instances, the starting suspension of liposomes includes liposomes having an average size (e.g., an average diameter) of 500 nm or more, such as 600 nm or more, or 700 nm or more, or 800 nm or more, or 900 nm or more, or 1000 nm or more, or 1250 nm or more, or 1500 nm or more, or 1750 nm or more, or 2000 nm or more, or 2250 nm or more, or 2500 nm or more, or 2750 nm or more, or 3000 nm or more, where in some instances the size is 5000 nm or less, such as 4000 nm or less, including 3000 nm or less. For example, the starting suspension of liposomes may include large multilamellar vesicles (LMVs), e.g., multilamellar vesicles having an average size of 200 nm or more, such as ranging from 200 nm to 3,000 nm. In some instances, the starting suspension of liposomes may include large unilamellar vesicles (LUVs), e.g., unilamellar vesicles having an average size of 100 nm or more, such as ranging from 100 nm to 1000 nm.

In some cases, embodiments of the methods may include a step of producing the starting suspension of liposomes. As described above, the suspension of liposomes may be heterogeneous with respect to the sizes of the liposomes in the suspension of liposomes. The suspension of heterogeneous liposomes may be produced using any convenient method for producing liposomes, such as, but not limited to, a solvent dispersion process (e.g., Bangham method, which includes the dissolution of lipids in an organic solvent and then removal of the organic solvent, such as by evaporation of the organic solvent), a detergent removal process (e.g., where detergent-lipid micelles are formed, followed by removal of the detergent to form the liposomes), an injection process (e.g., where lipids are dissolved in an organic solvent and the resulting lipid solution is injected into an aqueous media), a microfluidic process (e.g., where a stream of lipids dissolved in an organic solvent is passed between two aqueous streams in a microfluidic channel), a mechanical dispersion process, a sonication process, combinations thereof, and the like.

Liposomes useful in embodiments of the present disclosure are composed of lipids. In certain embodiments, the lipids are amphiphilic. Amphiphilic lipids may include a hydrophilic group and one or more lipophilic groups covalently bonded to the hydrophilic group. In some cases, the hydrophilic group is a charged group, such as an anionic group or a cationic group. In some instances, the hydrophilic group is an uncharged, polar group. In some embodiments, the hydrophilic group includes a charged group and a polar group. Examples of hydrophilic groups include, but are not limited to, phosphate, phosphocholine, phosphoglycerol, phosphoethanolamine, phosphoserine, phosphoinositol, ethylphosphophorylcholine, polyethyleneglycol, polyglycerol, sphingosine, phosphoshingosine, tri-nitrilotriacetic acid, melamine, glucosamine, trimethylamine, spermine, spermidine, and conjugated carboxylates, sulfates, boric acid, sulfonates, sulfates, carbohydrates, amino acids, and the like. In some cases, the hydrophilic group includes phosphocholine.

In certain embodiments, the lipophilic group includes an aliphatic chain, such as a saturated or unsaturated, linear or branched, substituted or unsubstituted aliphatic chain. For example, the lipophilic group may include an aliphatic chain of 2 to 40 carbon atoms in length, and may be saturated or unsaturated, linear or branched, substituted or unsubstituted. For instance, the lipophilic group may include a saturated or unsaturated, linear or branched, substituted or unsubstituted hydrocarbon chain having from 2 to 40 carbon atoms, such as from 4 to 30 carbon atoms, or from 4 to 25 carbon atoms, or from 6 to 24 carbon atoms, or from 10 to 20 carbon atoms. In certain cases, the lipophilic group includes a saturated or unsaturated, linear or branched hydrocarbon chain having 18 carbon atoms. In certain cases, the lipophilic group includes a saturated or unsaturated, linear or branched hydrocarbon chain having 16 carbon atoms. In embodiments where the lipid includes more than one lipophilic group, the lipophilic groups may be the same, or in other cases may be different. Liposomes may be composed of the same type of lipid or combinations of two or more different types of lipids.

Embodiments of the liposomes may include liposomes having a detectable label. In some cases, the detectable label is stably associated with a support. By "stably associated" is meant that a moiety is bound to or otherwise associated with another moiety or structure under standard conditions. Bonds may include covalent bonds and non-covalent interactions, such as, but not limited to, ionic bonds, hydrophobic interactions, hydrogen bonds, van der Waals forces (e.g., London dispersion forces), dipole-dipole interactions, and the like. In certain embodiments, the detectable label is covalently bound to the liposome. For instance, as described above, lipids that comprise the liposome may include a hydrophilic group, which, in some cases may include an activated functional group that provides for a covalent attachment to the detectable label. Any convenient activated functional group useful in chemical synthesis may be used to covalently bond the detectable label to the hydrophilic group of a lipid, such as, but not limited to, amine, carboxyl, amide, hydroxy, azide, maleimide, bromoacetyl, 2-pyridyl-dithiol, haloalkyl, alkene, or propargyl, or the like.

Liposomes according to embodiments of the present disclosure can include a payload associated with the liposome. As used herein, "payload" refers to a component that is contained within the structure of a liposome, present in a bilayer of lipid particles, or attached to a surface of a liposome (e.g., by a covalent bond or non-covalent interaction). Thus, a payload can include components that are encapsulated by the liposome (e.g., pharmaceutically active agents, nutriceutical agents, cosmeceutical agents, imaging agents, radiopharmaceutical agents, nuclear magnetic resonance contrast agents, and the like). In certain embodiments, the encapsulated payload is in solution, or may be present as a crystal, as a powder, or a combination thereof. For example, in embodiments where it is desired to provide liposomes with an encapsulated payload (e.g., an encapsulated agent, a therapeutic agent, imaging agent, or the like), such agents may be included in an aqueous phase inside the liposome. Alternatively, in embodiments where the agent is hydrophobic and thus less soluble in water, the hydrophobic agent can be included within a portion of the lipid bilayer.

Methods of the present disclosure are useful for producing a population of liposomes as described above, e.g., a population of liposomes of defined size. In some embodiments, the population of liposomes has an average size less than the average size of the starting suspension of liposomes. In some cases, the produced population of liposomes has an average size (e.g., an average diameter) of 1000 nm or less, such as 900 nm or less, or 800 nm or less, or 700 nm or less, or 600 nm or less, or 500 nm or less, or 400 nm or less, or 300 nm or less, or 250 nm or less, or 200 nm or less, or 150 nm or less, or 100 nm or less, or 75 nm or less, or 50 nm or less, or 25 nm or less, or 20 nm or less, or nm or less, or 10 nm or less, or 5 nm or less, or 1 nm or less, where in some instances the size average size is 1 nm or more, such as 5 nm or more. In certain instances, the produced population of liposomes has an average size of 1000 nm or less. In certain instances, the produced population of liposomes has an average size of 800 nm or less. In certain instances, the produced population of liposomes has an average size of 500 nm or less. In certain instances, the produced population of liposomes has an average size of 400 nm or less. In certain instances, the produced population of liposomes has an average size of 300 nm or less. In certain instances, the produced population of liposomes has an average size of 250 nm or less. In certain instances, the produced population of liposomes has an average size of 200 nm or less. In certain instances, the produced population of liposomes has an average size of 100 nm or less. In certain instances, the produced population of liposomes has an average size of 50 nm or less. For example, the produced population of liposomes may include small unilamellar vesicles (SUVs), e.g., unilamellar vesicles having an average size of 100 nm or less, such as ranging from 10 nm to 100 nm.

In certain instances, the starting suspension of liposomes has an average size that is larger than the pores of the membrane. In some instances, drawing larger-sized liposomes through smaller-sized pores in the membrane resizes the liposomes to an average size approximately the same as the size of the pores of the membrane.

Additional Aspects

In certain embodiments, the method also includes mixing the contents of the liposome extrusion system after introducing the suspension of liposomes into the liposome extrusion system. The mixing may be performed using any convenient protocol. For example, the mixing may be performed using an agitator. The agitator may be any convenient agitator sufficient for mixing a liquid inside a liquid container, including, but not limited to, vortexers, sonicators, shakers (e.g., manual, mechanical, or electrically powered shakers), rockers, oscillating plates, magnetic stirrers, static mixers, rotators, blenders, mixers, tumblers, orbital shakers, among other agitating protocols.

In some cases, the method also includes assaying the produced population of liposomes. Assaying the population of liposomes may be performed using any suitable assay apparatus. For example, the assay may be an assay for determining the average size of the population of liposomes, the polydispersity of the population of liposomes, or a combination thereof. In some cases, the assay may be performed by dynamic light scattering (DLS). In some cases, the assay apparatus may be a flow cytometer. In these embodiments, the assaying includes flow cytometrically analyzing the population of liposomes. In certain embodiments, the liposomes include a fluorescent label, and thus certain embodiments of the assaying include contacting the population of liposomes with electromagnetic radiation (e.g., light), such as electromagnetic radiation having a wavelength that corresponds to an excitation maxima of the fluorescent label of the liposomes. The assaying may further include detecting emitted light from the excited fluorescent label. For instance, the method may include detecting emitted light from the excited fluorescent label at one or more wavelengths that correspond to the emission maxima of the fluorescent label. In certain embodiments, the population of liposomes may be used in methods for calibrating a flow cytometer, e.g., the population of liposomes may be used as a calibration standard for a flow cytometer.

In certain embodiments, the fluorescent label includes one or more detectable moieties or markers that are detectible based on, for example, fluorescence emission maxima, fluorescence polarization, fluorescence lifetime, light scatter, mass, molecular mass, or combinations thereof. In certain embodiments, the fluorescent label includes a fluorophore (i.e., a fluorescent label, fluorescent dye, etc.). Fluorophores of interest may include but are not limited to dyes suitable for use in analytical applications (e.g., flow cytometry, imaging, etc.). A large number of dyes (e.g., non-polymeric dyes) are commercially available from a variety of sources, such as, for example, Molecular Probes (Eugene, OR) and Exciton (Dayton, OH). For example, the fluorophore of the dye may be 4-acetamido-4'-isothiocyanatostilbene-2,2'disulfonic acid; acridine and derivatives such as acridine, acridine orange, acrindine yellow, acridine red, and acridine isothiocyanate; 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin (PE); o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; carotenoid-protein complexes, such as peridinin-chlorophyll proteins (PerCP); allophycocyanin (APC); or combinations thereof.

Suitable flow cytometry systems and methods for analyzing samples that may be employed in methods of the invention include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ and FACSCanto II™ flow cytometers, BD Biosciences FACSVantage™, BD Biosciences FACSort™, BD Biosciences FACSCount™, BD Biosciences FACScan™, and BD Biosciences FACSCalibur™ systems, BD Biosciences Influx™ cell sorter, BD Biosciences Accuri™ C6 flow cytometer; BD Biosciences LSRFortessa™ flow cytometer, BD Biosciences LSRFortessa™ X-20 flow cytometer, BD Biosciences FACSVerse™ flow cytometer, BD Biosciences FACSAria™ III and BD FACSAria™ Fusion flow cytometers, BD Biosciences FACSJazz™ flow cytometer, or the like. In certain embodiments, the subject systems are flow cytometric systems, such those described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference in their entirety.

Other methods of analysis may also be used, such as, but not limited to, liquid chromatography-mass spectrometry or gas chromatography-mass spectrometry systems. For example, assaying may include the use of an analytical separation device such as a liquid chromatograph (LC), including a high performance liquid chromatograph (HPLC), a micro- or nano-liquid chromatograph or an ultra-high pressure liquid chromatograph (UHPLC) device, a capillary electrophoresis (CE), or a capillary electrophoresis chromatograph (CEC) apparatus. Mass spectrometer (MS) systems may also be used to assay the dye compositions. Examples of mass spectrometers may include, but are not limited, to electrospray ionization (ESI), atmospheric pressure chemical ionization (APCI), electron impact (EI), atmospheric pressure photoionization (APPI), matrix-assisted laser desorption ionization (MALDI) or inductively coupled plasma (ICP) ionization, for example, or any combination thereof. Likewise, any of a variety of different mass analyzers may be employed, including time of flight (TOF), Fourier transform ion cyclotron resonance (FTICR), ion trap, quadrupole or double focusing magnetic electric sector mass analyzers, or any hybrid thereof.

In certain embodiments, the method also includes storing the liposomes for a period of time, e.g. in the receiving container or in another container. The liposomes may be stored for a period of time before and/or after producing the population of liposomes. In some instances, the liposomes are stored for a period of time such as 1 hour or more, or 4 hours or more, or 6 hours or more, or 12 hours or more, or 18 hours or more, or 24 hours or more, or 48 hours or more, or 72 hours or more, or 4 days or more, or 5 days or more, or 6 days or more, or 1 week or more.

Embodiments of the method may further include shipping the liposomes to a remote location. A "remote location," is a location other than the location at which the liposomes are produced. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or one hundred miles or more apart.

In some cases, the population of liposomes can be produced without use of a centrifuge to exert a centrifugal force on the liposomes. Such a centrifuge could generate large forces on the liposomes. As such, in some cases the maximum acceleration force experienced by the liposomes is 10 m/s$^2$ or less, wherein gravitational acceleration on the surface of the Earth is about 9.8 m/s$^2$. Centrifuging the liposomes could generate centrifugal acceleration forces that are significantly above 10 m/s$^2$.

As described above, the methods include applying a vacuum force to the liposomes. In some cases atmospheric pressure is about 101 kPa during the method, and thus the vacuum force has a magnitude of less than about 101 kPa. In some embodiments the method is performed without using a pump to create a pressure that is higher than atmospheric pressure, i.e., without using a pressure that would push the liposomes through the porous membrane. As such, in some cases the maximum pressure difference experienced by the suspension of liposomes during the method is 110 kPa or less, e.g., 105 kPa or less, 100 kPa or less, or 90 kPa or less. Furthermore, in some cases the membrane holder and the liposome collection container contact each other without a fastener that fastens the two elements together. As such, in some cases the membrane holder and liposome collection container can be separated without removing or disabling a fastener. In some cases, the only force substantially resisting the separation of such elements is gravity. In some embodiments separating the membrane holder and liposome collection container can be performed, in the absence of a vacuum force, with a force of less than 20 N, such as less than 10 N, less than 5 N, or less than 2.5 N.

Apparatuses

Aspects of the present disclosure include liposome extrusion apparatuses. A liposome extrusion apparatus of the present disclosure is useful for the production of a population of liposomes.

A liposome extrusion apparatus includes a liposome collection container, a membrane holder, and a vacuum source. As described below, a liposome extrusion system includes a liposome collection container and a membrane holder. As such, a liposome extrusion apparatus can also be referred to as including a liposome extrusion system and a vacuum source.

When performing the methods described herein, the membrane holder is positioned such that the porous membrane is located in the interior of the liposome collection container, thereby allowing the vacuum force to draw the liposomes through the porous membrane and into the interior of the collection container. In addition, the vacuum source is operably connected to the opening in the wall of the liposome collection container. As such, the vacuum source is able to transmit a vacuum force through the opening of the wall of the collection container, through the interior of the collection container, through the porous membrane, and to the suspension of liposomes. In some embodiments the apparatus further includes a vacuum adapter operably connected to the opening in the wall of the liposome collection container. The vacuum force can be transmitted from the vacuum source to the opening in the wall of the liposome collection container during the method and thereby draw the liposomes through the porous membrane.

Membrane Holder

The membrane holder can be referred to as having a longitudinal axis and one or more transverse axes that are perpendicular to the longitudinal axis. For instance, the porous membrane can form a plane and the longitudinal axis can be perpendicular to the plane. As such, in some cases membrane holder is positioned such that the porous membrane is horizontal and the longitudinal axis is vertical, wherein applying a vacuum force will cause the liposomes to move downwards through the porous membrane. In such an orientation the open first end is located towards the top of the membrane holder whereas the second end with the membrane holder is located towards the bottom. In addition, the membrane holder has a transverse axis that is perpendicular to the longitudinal axis, e.g., wherein the transverse axis is horizontal and parallel to the porous membrane.

As such, in some cases the membrane holder has a first dimension (i.e. the transverse axis) that is parallel to the porous membrane and ranges from 0.5 cm to 20 cm, such as from 0.75 cm to 15 cm or from 1 cm to 10 cm. In some instances the membrane holder has a second dimension (i.e. a longitudinal axis) that is perpendicular to the porous membrane and ranges from 1 cm to 25 cm, such as from 1.5 cm to 20 or from 2 cm to 15 cm. In some instances the first dimension, i.e. the transverse axis, is a diameter. In some instances such dimensions are outer dimensions, i.e. a dimension of one or more outer surfaces of the membrane holder.

The size of the membrane holder, and thus the liposome suspension holding volume, can in some cases range from 0.1 ml to 1000 ml, such as from 0.1 ml to 900 ml, or 0.1 ml to 800 ml, or 0.1 ml to 700 ml, or 0.1 ml to 600 ml, or 0.1 ml to 500 ml, or 0.1 ml to 400 ml, or 0.1 ml to 300 ml, or 0.1 ml to 200 ml, or 0.1 ml to 100 ml, or 0.1 ml to 50 ml, or 0.1 ml to 25 ml, or 0.1 ml to 10 ml, or 0.1 ml to 5 ml, or 0.1 ml to 2 ml, or 0.1 ml to 1.5 ml, or 0.1 ml to 1 ml, or 0.1 ml to 0.5 ml. In certain instances, the membrane holder is configured to have a liposome suspension holding volume ranging from 1 ml to 750 ml, such as from 5 ml to 500 ml or from 10 ml to 200 ml. The liposome suspension volume can also be referred to as an interior of the membrane holder.

The open first end membrane holder exposes the interior of the liquid container to the surrounding environment, e.g., such that the contents of the liquid container are under the same atmospheric pressure as the surrounding environment. For example, the first open end may be used to allow access to the interior of the liquid container, such as for introducing a suspension of liposomes into the liquid container or removing a suspension of liposomes from the liquid container.

Embodiments of the membrane holder can be compatible with the liquid and/or liposomes or other ingredients that may be in contact with the membrane holder. Examples of suitable membrane holder materials for the liposome extrusion apparatuses include, but are not limited to, plastics, such as polypropylene, polymethylpentene, polytetrafluoroethylene (PTFE), perfluoroethers (PFE), fluorinated ethylene propylene (FEP), perfluoroalkoxy alkanes (PFA), polyethylene terephthalate (PET), polyethylene (PE), polyetheretherketone (PEEK), and the like. In some instances the membrane holder comprises a polymeric material, e.g., a plastic material. Exemplary polymeric materials include polycarbonate, polyester, nylon, cellulose, cellulose acetate, polyethylene terephthalate, and the like. In some cases the membrane holder does not comprise a metal material. In some embodiments the membrane holder does not comprise a glass material.

Porous Membrane

In certain embodiments, the membrane pores pass through the membrane in a non-tortuous path. For example, the porous membrane may include pores having a longitudinal axis substantially perpendicular to a surface of the membrane. In some cases, the porous membrane may include pores having a longitudinal axis at an angle of less than 90° relative to a surface of the membrane. In certain instances, the porous membrane does not include a web-like or matrix construction where a network of pores are interconnected, thus forming a tortuous path through the membrane. Stated another way, the porous membrane may include distinct pores that pass through the membrane without intersecting other pores in the membrane.

In certain embodiments, the porous membrane is composed of one or more layers of a membrane material. For example, the membrane may be composed of a single layer of a membrane material. In other embodiments, the membrane is composed of two or more layers of a membrane material. For instance, the membrane may include 2 layers of a membrane material, such as 3 or more layers, or 4 or more layers, or 5 or more layers, or 6 or more layers, or 7 or more layers, or 8 or more layers, or 9 or more layers, or 10 or more layers of a membrane material. In some cases, the membrane includes 2 layers of a membrane material. In some cases, the membrane includes 3 layers of a membrane material. In embodiments that include two or more layers of a membrane material, the membrane material of each layer may be the same, or may be different. In certain embodiments, the pore size of each of the two or more layers of the membrane material is the same. In other embodiments, the pore size of at least two of the two or more layers of the membrane material are different.

The membrane may be composed of any suitable membrane material. In some cases, the membrane material is compatible with the liquid and/or liposomes in contact with the membrane. For example, the membrane material can be a liquid-compatible membrane material, such as a hydrophilic membrane material. In some cases, the liposomes may be in an aqueous liquid, and in these cases, the membrane material may be compatible with aqueous media. By "compatible" is meant that the membrane material is substantially inert (e.g., does not significantly react with or degrade) in the presence of the liquid and/or liposomes or other ingredients in contact with the membrane. Examples of suitable membrane materials include polymeric materials, for example, polymers, such as, but not limited to, polycarbonate, polyester, nylon, cellulose, cellulose acetate, polyethylene terephthalate, and the like. In some instances, the membrane material is polycarbonate. In some instances, the membrane material is polyester.

Liposome Collection Container

Liposome collection containers that can be used with the present methods include an open first end and a closed bottom (i.e. a closed second end) separated by a wall that collectively define an interior. The collection containers further include an opening in the wall to the interior.

The liposome collection container can be referred to as having a longitudinal axis and one or more transverse axes that are perpendicular to the longitudinal axis. For instance, the longitudinal axis can be perpendicular to the open first end. As such, in some cases collection container is positioned such that longitudinal axis is vertical whereas a transverse axis is horizontal, e.g. wherein the open first end is at a top of the collection container. In some embodiments the opening in the wall of the collection container is located on a side wall of the collection container. As such, in some cases the opening is perpendicular to a transverse axis.

As such, in some cases the collection container has a first dimension (e.g. the transverse axis) that ranges from 1.5 cm to 21 cm, such as from 1.75 cm to 16 cm or from 1.5 cm to 10.5 cm. In some cases the first dimension is a diameter. In some instances the collection container has a second dimension (e.g. a longitudinal axis) that ranges from 1 cm to 26 cm, such as from 1.5 cm to or from 2 cm to 21 cm. In some instances such dimensions are outer dimensions, i.e. a dimension of one or more outer surfaces of the collection container.

The size of the liquid container may depend on the volume of liquid to be held in the liquid container. For instance, the liquid container may be configured to hold a volume (e.g., a volume of a liquid) ranging from 0.1 ml to 1000 ml, such as from 0.1 ml to 900 ml, or 0.1 ml to 800 ml, or 0.1 ml to 700 ml, or 0.1 ml to 600 ml, or 0.1 ml to 500 ml, or 0.1 ml to 400 ml, or 0.1 ml to 300 ml, or 0.1 ml to 200 ml, or 0.1 ml to 100 ml, or 0.1 ml to 50 ml, or 0.1 ml to 25 ml, or 0.1 ml to 10 ml, or 0.1 ml to 5 ml, or 0.1 ml to 2 ml, or 0.1 ml to 1.5 ml, or 0.1 ml to 1 ml, or 0.1 ml to 0.5 ml. In certain instances, the liquid container is configured to hold a volume ranging from 0.1 ml to 5 ml, such as, for example, 0.5 ml, or 1 ml, or 1.5 ml, or 2 ml. In other instances, the liquid container is configured to hold a volume ranging from 0.1 ml to 10000 ml, such as from 1 ml to 750 ml, from 10 ml to 550 ml, from 50 ml to 250 ml, or from 20 ml to 150 ml.

Embodiments of the liposome collection container can be compatible with the liquid and/or liposomes or other ingredients that may be in contact with the membrane holder. Examples of suitable collection container materials for the liposome extrusion apparatuses include, but are not limited to, plastics, such as polypropylene, polymethylpentene, polytetrafluoroethylene (PTFE), perfluoroethers (PFE), fluorinated ethylene propylene (FEP), perfluoroalkoxy alkanes (PFA), polyethylene terephthalate (PET), polyethylene (PE), polyetheretherketone (PEEK), and the like. In some instances the collection container comprises a polymeric material, e.g., a plastic material. Exemplary polymeric materials include polycarbonate, polyester, nylon, cellulose, cellulose acetate, polyethylene terephthalate, and the like. In some cases the collection container does not comprise a metal material. In some embodiments the collection container does not comprise a glass material.

Vacuum Adapter

The vacuum adapter can be configured to transmit a vacuum force from the vacuum source to the opening in the wall of the liposome collection container. For instance, the vacuum adapter can have a first opening (i.e. a vacuum intake opening) and a second opening (i.e. a vacuum output opening) separated by a wall that collectively define an interior of the vacuum adapter. In some cases the vacuum source is operable connected to the first vacuum intake opening, i.e. such that a vacuum force can be transmitted from the vacuum source to the interior of the vacuum adapter. The first vacuum intake opening is in fluid communication with the vacuum source, thereby allowing the vacuum force to be transmitted. In some cases, another element such as a hose is used to connect the vacuum source to the first vacuum intake opening. Furthermore, the second vacuum output opening can be operably connected to the opening of the wall of the liposome collection container. For instance, at least part of the liposome collection container can be inserted through the second vacuum output opening and into the interior of the vacuum adapter. As such, when a vacuum force is generated in the interior of the vacuum adapter, such a vacuum force is also exerted on the opening of the liposome collection container. This vacuum force is then transmitted through the interior of the liposome collection container, through the porous membrane, and to the liposome suspension, causing the liposome suspension to be drawn through the porous membrane. As such, there is fluid communication from the vacuum source, through the vacuum adapter, and to the opening in the wall of the liposome collection container, thereby allowing for the transmittal of the vacuum force.

The vacuum adapter can be referred to as having a longitudinal axis and one or more transverse axes that are perpendicular to the longitudinal axis. For instance, the longitudinal axis can be perpendicular to the second opening. As such, in some cases vacuum adapter is positioned such that longitudinal axis is vertical whereas a transverse axis is horizontal, e.g. wherein the first opening is at a top of the vacuum adapter. Thus, if the collection container is at least partially placed into the vacuum adapter, both elements are oriented vertically.

As such, in some cases the vacuum adapter has a first dimension (e.g. the transverse axis) that ranges from 2 cm to 21.5 cm, such as from 2 cm to 16.5 cm or from 2 to 11 cm. In some cases the first dimension is a diameter. In some instances the collection container has a second dimension (e.g. a longitudinal axis) that ranges from 1.5 cm to 26.5 cm, such as from 2 cm to 25.5 or from 2.5 cm to 21.5 cm. In some instances such dimensions are outer dimensions, i.e. a dimension of one or more outer surfaces of the collection container. In embodiments wherein the collection container is at least partially inserted into and located within the interior of the vacuum adapter, the vacuum adapter can have an inner dimension that is greater than an outer dimension of the collection container, thereby allowing insertion.

Examples of suitable vacuum adapter materials for the liposome extrusion apparatuses include, but are not limited to, plastics, such as polypropylene, polymethylpentene, polytetrafluoroethylene (PTFE), perfluoroethers (PFE), fluorinated ethylene propylene (FEP), perfluoroalkoxy alkanes (PFA), polyethylene terephthalate (PET), polyethylene (PE), polyetheretherketone (PEEK), and the like. In some instances the vacuum adapter comprises a polymeric material, e.g., a plastic material. Exemplary polymeric materials include polycarbonate, polyester, nylon, cellulose, cellulose acetate, polyethylene terephthalate, and the like. In some cases the vacuum adapter does not comprise a metal material. In some embodiments the vacuum adapter does not comprise a glass material.

Systems

Systems of the present disclosure include a liposome collection container and a membrane holder, as described herein. The liposome collection container has an open first end and a closed bottom separated by a wall that collectively define an interior. The collection container further includes an opening in the wall of the interior. The membrane holder includes an open first end and a porous membrane located at a second end separated by a wall therebetween that collectively define a liposome suspension volume.

As described above, an apparatus includes a liposome collection container, a membrane holder, and a vacuum source. As such, an apparatus can also be referred to as including a system and a vacuum source.

The membrane holder is configured to be positioned such that the porous membrane can be located in the interior of the liposome collection container. For instance, an outer dimension (e.g. an outer diameter) of the membrane holder at the second end can be less than an inner dimension (e.g. an inner diameter) of the liposome collection container at its open first end. Thus, the second end with the porous membrane can be moved into the interior of the collection container without the need to break or deform any of the elements.

In some cases, the membrane holder is positioned such that the porous membrane is located in the interior of the liposome collection container. In other cases, the membrane holder is positioned such that the porous membrane is located outside of the interior of the liposome collection container.

In some embodiments the system further includes a vacuum adapter, e.g. as described above. In some cases the vacuum adapter is operably coupled to the collection container, and in other cases the vacuum adapter is not coupled to the collection container.

The system can also include one or more sealing elements, e.g., gaskets, that can be used to seal elements to one another. For instance, a sealing element can be configured to seal the membrane holder to the collection container, and another sealing element can be configured to seal the collection container to the vacuum adapter.

Kits

Aspects of the disclosure also include kits that include a subject liposome extrusion system and packaging configured to hold the system. The packaging may be a sealed packaging, e.g., a water-resistant and/or water vapor-resistant container, optionally under a gas-tight and/or vacuum seal. In certain instances, the packaging is a sterile packaging, configured to maintain the system enclosed in the packaging in a sterile environment. By "sterile" is meant that there are substantially no microbes (such as fungi, bacteria, viruses, spore forms, etc.).

The kits may further include a liquid. For instance, the kit may include a buffer, such as a sample buffer, a wash buffer, an assay buffer, and the like. In some cases, the kit may include a liquid suitable for a suspension of liposomes. The kits may further include additional reagents, such as but not limited to, detectable labels (e.g., fluorescent labels, colorimetric labels, chemiluminescent labels, multicolor reagents, avidin-streptavidin associated detection reagents, radiolabels, gold particles, magnetic labels, etc.), and the like.

In certain embodiments, the kits may also include a calibration standard. For example, the kits may include a set of labelled beads, such as a set of standard fluorescently labelled beads. The calibration standard may be useful for determining the accuracy of the assay apparatus and for ensuring consistency between subsequent assays. For example, the calibration standard may be useful for determining the accuracy of a flow cytometer. In some cases, the calibration standard includes a labelled bead, such as a fluorescently labelled bead. The fluorescently labelled bead may be a standard fluorescently labeled bead that is typically used as a calibration standard. Examples of standard fluorescently labeled beads include, but are not limited to, fluorescently labelled microparticles or nanoparticles. In some cases, the fluorescently labeled beads are configured such that they remain suspended in the assay mixture and do not substantially settle or aggregate. In some embodiments, the fluorescently labeled beads include, but are not limited to, fluorescently labelled polystyrene beads, fluorescein beads, rhodamine beads, and other beads tagged with a fluorescent dye. Additional examples of fluorescently labeled beads are described in U.S. Pat. Nos. 6,350,619; 7,738,094; and 8,248,597, the disclosures of each of which are herein incorporated by reference in their entirety.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another form would be a computer readable medium, e.g., CD, DVD, Blu-Ray, computer-readable memory (e.g., flash memory), etc., on which the information has been recorded or stored. Yet another form that may be present is a website address which may be used via the Internet to access the information at a removed site. Any convenient form of instructions may be present in the kits.

Utility

The present methods, systems and apparatuses find use in applications where a population of liposomes of defined size may be desired, e.g., for research or laboratory testing, or in the production of therapeutic compositions. In some embodiments, the subject methods, apparatuses and systems facilitate the accurate analysis of analytes (e.g., cells) obtained from a biological sample (e.g., organ, tissue, tissue fragment, fluid). In certain instances, the subject methods, apparatuses and systems find use in testing the accuracy of an apparatus used for the analysis of such analytes for research or laboratory testing. For example, the subject methods, apparatuses and systems find use in testing the accuracy of a flow cytometer. In some cases, the population of liposomes produced using the methods, apparatuses and systems of the present disclosure are used as a calibration standard for an apparatus, such as a flow cytometer. Thus, the subject methods, apparatuses and systems find use in the efficient preparation of a population of liposomes from a suspension of heterogeneous liposomes.

For instance, the present methods allow for the production of a population of liposomes with relatively common and inexpensive laboratory equipment. For example, some liposome extrusion devices involve the use of centrifuges or high pressure pumps to force the liposomes through an extrusion membrane. However, the present methods involve a vacuum source and the systems described herein. Since vacuum sources can be more common and inexpensive compared to centrifuges and high pressure pumps, the present methods allow for such advantages over other methods of making a population of liposomes.

In addition, centrifuges and pumps can generate considerably higher forces on components, thereby requiring more durable and expensive materials. However, the present vacuum forces can have a relatively lower magnitude, allowing the use of less expensive materials and therefore, in some cases, disposable items. Furthermore, using disposable items removes the need to clean items between different uses. For instance, whereas an extrusion membrane in a pump system might require disassembly and cleaning between two different samples, a used membrane holder could simply be discarded and a new, second membrane holder could be used for a second sample. Furthermore, in some cases the membrane holder can simply be placed on top of the collection container without the need for fasteners to hold the elements together. Thus, the system can be quickly and easily disassembled after use to collect the liposomes.

The subject methods, apparatuses and systems find use in the preparation of a population of liposomes for therapeutic applications, such as liposomes that contain a substance, e.g., a drug, a protein, a fluorescent compound, etc., which can be used to deliver the substance to a target area in a subject. For example, the subject methods, apparatuses and systems fid use in the preparation of a population of liposomes for drug delivery, cell therapy and in vivo applications, as well as analytical applications, such as for immune analysis.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s); and the like.

General Procedure

A dry lipid mixture was produced by lyophilization or by drying under a stream of inert gas, followed by dessication under vacuum.

The dry lipids were then hydrated with an aqueous solution for 30-60 minutes. For lipids with a high phase transition temperature, the aqueous solution was pre-warmed before the hydrating. In some cases the hydrated lipid suspension was subjected freeze/thaw cycles to increase the efficiency of the entrapment of water soluble compounds.

Figure 1B:
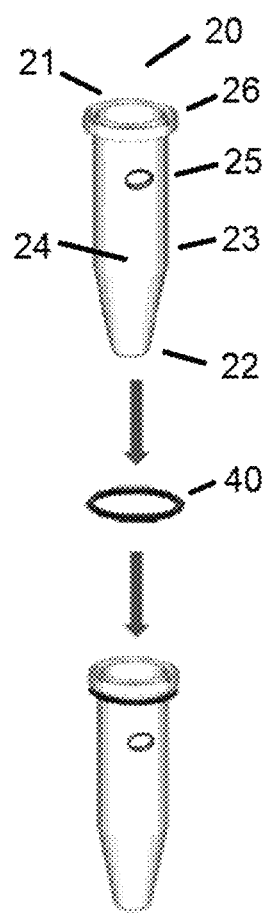
FIG. 1B shows a liposome collection container and an O-ring, in accordance with an embodiment of the invention.
Figure 1C:
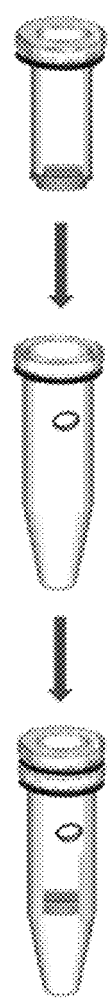
FIG. 1C shows the placement of a membrane holder into a liposome collection container, wherein the O-ring seals a flange of the membrane holder to a flange of the liposome collection container, in accordance with an embodiment of the invention.

Next, the membrane holder was placed into the liposome collection container, thereby generating a system. FIG. 1A shows a membrane holder 10 with an open first end 11 (at the top) and a porous membrane 12 at located at a second end 13 (at the bottom), which are separated by a wall 14 therebetween that collectively define a liposome suspension holding volume 15. FIG. 1A also shows an O-ring 30 positioned below a flange 16 at the first end of the membrane holder. FIG. 1B shows a liposome collection container 20 with an open first end 21 (at the top) and a closed bottom 22 separated by a wall 23 that collectively define an interior 24. The wall also has an opening 25 and a flange 26 at the top, wherein an O-ring 40 is positioned below the flange. FIG. 1C shows how the membrane holder can be placed into the interior of the liposome collection container, wherein one of the O-rings helps seal the two flanges, thereby helping to create a seal.

Figure 2:
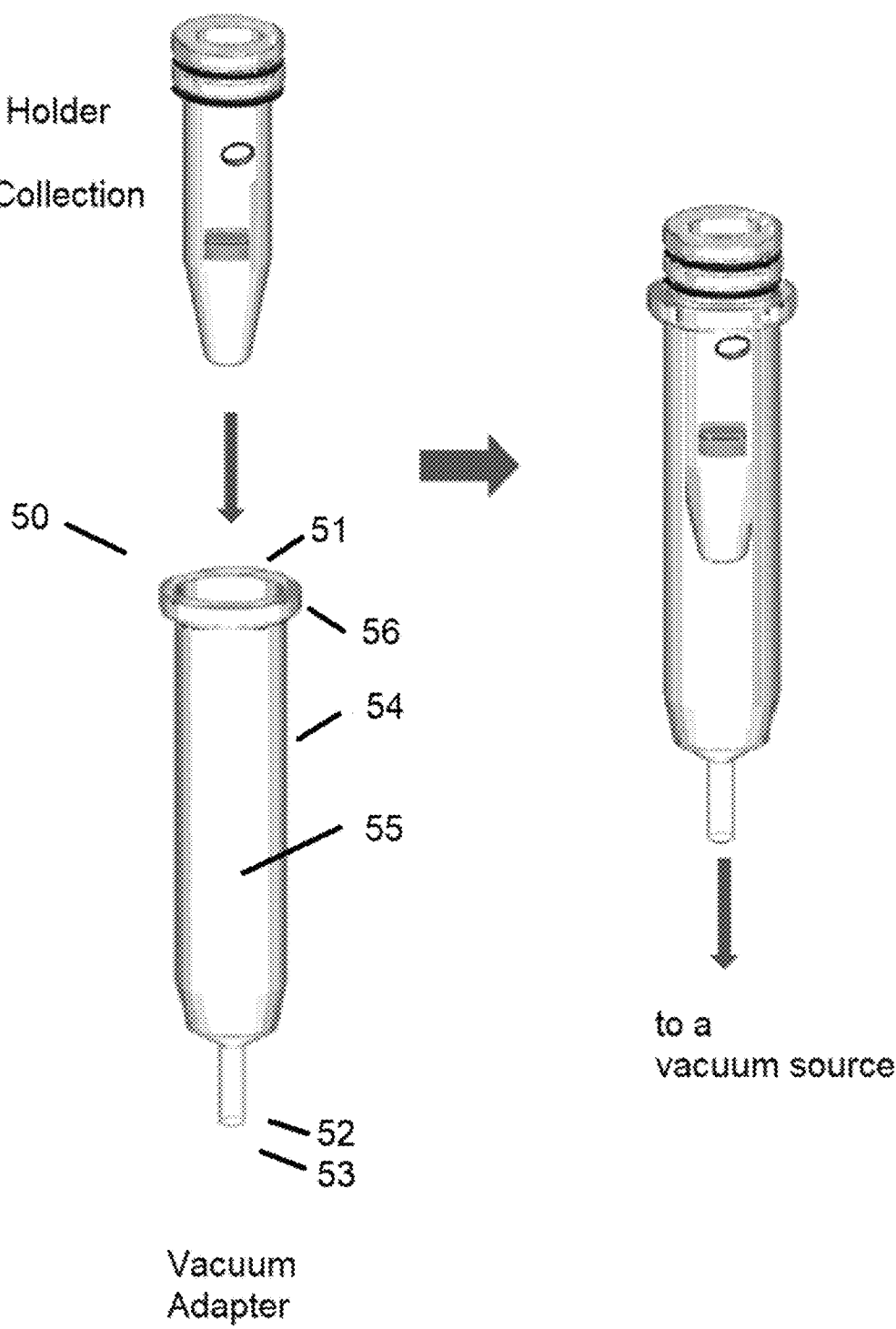
FIG. 2 shows the placement of a membrane holder and liposome collection container into a vacuum adapter, in accordance with an embodiment of the invention.

The system was then placed into a vacuum adapter such that a vacuum force can be transmitted through the opening in the wall of the liposome collection container. FIG. 2 shows the placement of a system into a vacuum adapter 50, wherein the second O-ring 40 helps form a seal between the liposome collection container and the vacuum adapter. Vacuum adapter 50 includes an open first end 51 (at the top), an opening 52 at a second end 53 (at the bottom), and a wall 54 therebetween that collectively define an interior 55. Also shown is flange 56 that can seal against flange 26 of the collection container through the O-ring 40. In addition, the opening in the wall of the liposome collection container connects the interior of the liposome collection container and the interior of the vacuum adapter. The vacuum adapter 50 of FIG. 2 is shown having an open end 52 at the bottom end 53 of the adapter, allowing for connection to a vacuum source. As such, a vacuum source could exert a vacuum force through the vacuum adapter, opening in the wall of the liposome collection container, and to the porous membrane.

The sample was loaded into the liposome suspension holding volume interior of the membrane holder. Next, a vacuum force was applied, thereby drawing the liposomes through the porous membrane into the interior and produce the population of liposomes.

In some cases, the extrusion procedure was repeated. In such cases, the vacuum force was removed and the membrane holder was removed from the liposome collection container. The aqueous fluid containing the liposomes was removed, the membrane holder was replaced to its original location, and the liposome containing fluid was placed into the membrane holder. The vacuum force was applied again, thereby drawing the liposomes through the porous membrane again.

Example 1

Figure 3:
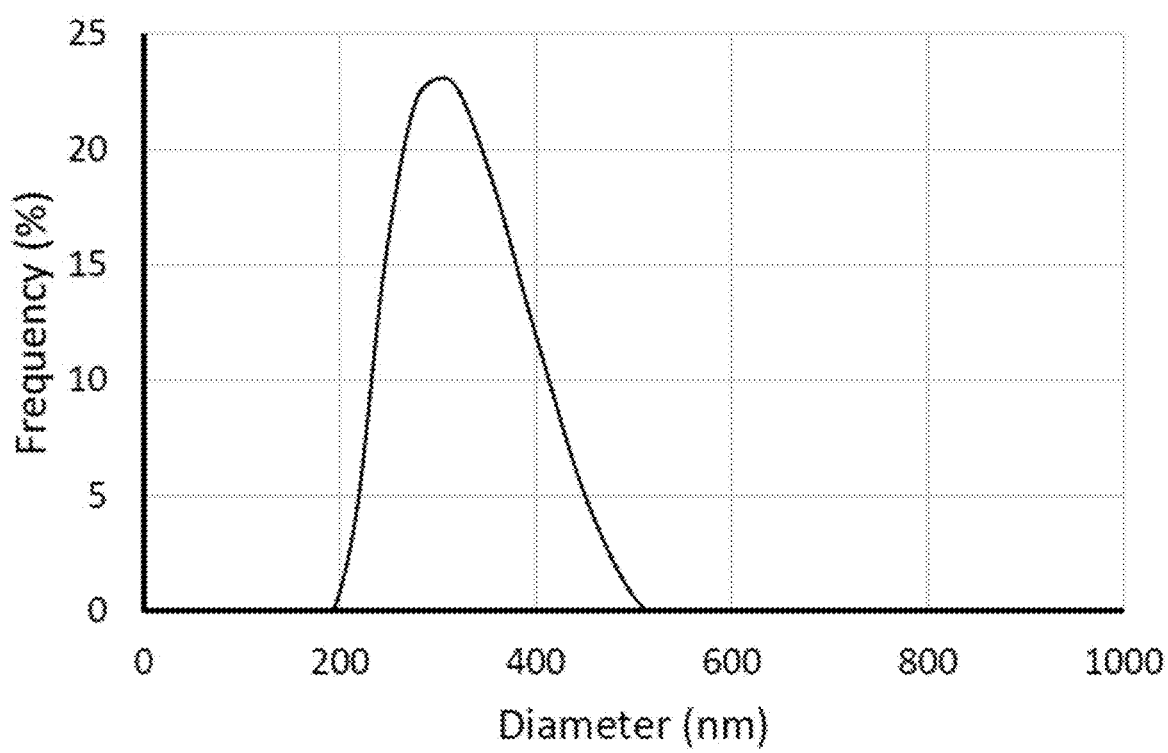
FIG. 3 shows the particle size distribution as determined by Dynamic Light Scattering (DLS) analysis for liposomes drawn through 400 nm membranes.

Using the general procedure described above, LMVs composed of 42 mol % PMPC, 14% DOPS, 13% DOPE, 30 mol % cholesterol, and 1 mol % DHPE-F were extruded 5 times in the system with 3 polycarbonate membrane with pore size of 400 nm under 88 kPa vacuum. Dynamic Light Scattering (DLS) showed that the produced liposomes had a size of 336.7+/−11.7 nm, as shown in FIG. 3.

Example 2

Figure 4:
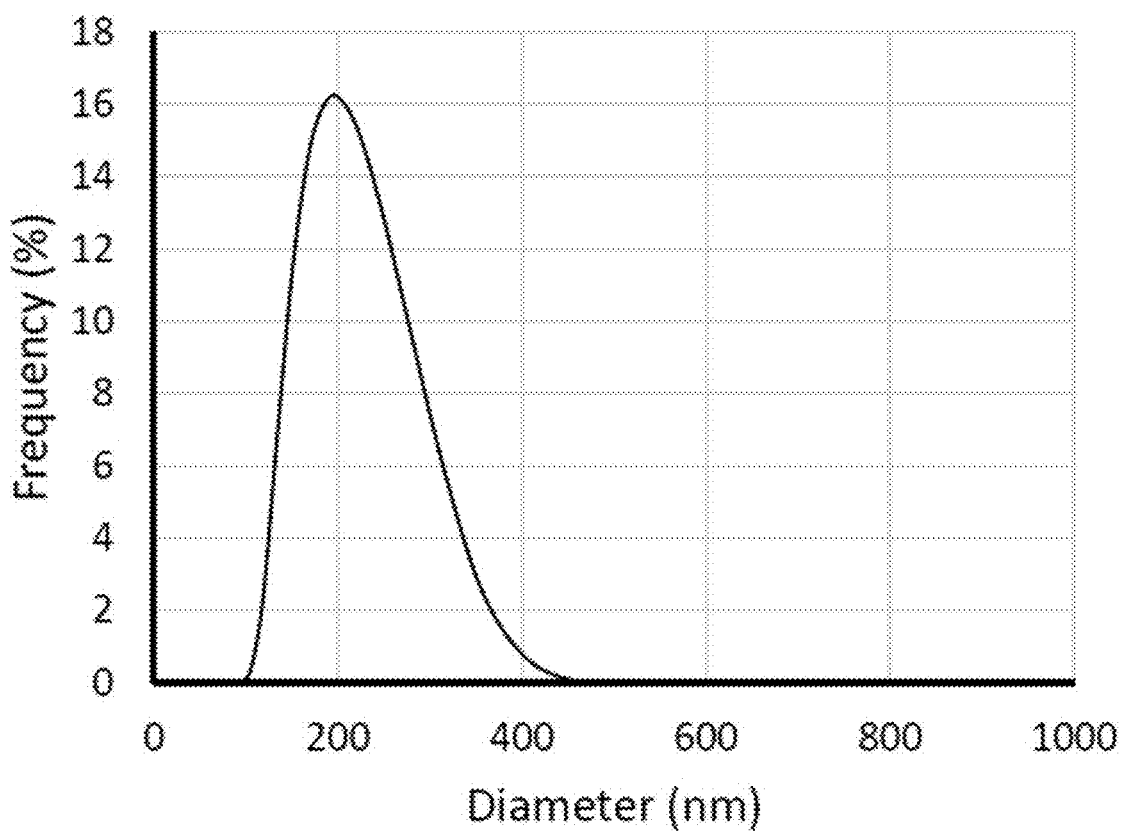
FIG. 4 shows the particle size distribution as determined by Dynamic Light Scattering (DLS) analysis for liposomes drawn through 200 nm membranes.

Using the general procedure described above, 42 mol % PMPC, 14% DOPS, 13% DOPE, 30 mol % cholesterol, and 1 mol % DHPE-F were extruded 10 times in the system with 3 polycarbonate membrane with pore size 800 nm under 88 kPa vacuum. The liposomes were then extruded an addition 5 times in a system with 1 polycarbonate membrane with pore size 200 nm under 88 kPa vacuum. Sizes of liposomes were 195.8+/−13.7 nm as determined by DLS and shown in FIG. 4.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for producing a population of liposomes, the method comprising:
   (a) providing a liposome extrusion system comprising:
      a liposome collection container comprising an open first end and a closed bottom separated by a wall that collectively define an interior, further comprising an opening in the wall to the interior;
      a membrane holder comprising an open first end and a porous membrane located at a second end separated by a wall therebetween that collectively define a liposome suspension holding volume, wherein the membrane holder is positioned such that the porous membrane is located in the interior of the liposome collection container;
   (b) introducing a liposome suspension into the liposome holding volume; and
   (c) applying a vacuum force through opening in a manner sufficient to draw liposomes through the porous membrane into the interior and produce the population of liposomes.

2. The method of claim 1, wherein the providing comprises placing the second end of the membrane holder into the interior of the liposome collection container.

3. The method of claim 1, wherein the opening in the wall of the liposome collection container is located above the porous membrane.

4. The method of claim 1, wherein the opening in the wall of the liposome collection container is oriented perpendicular to the porous membrane.

5. The method of claim 1, wherein the membrane holder is oriented such that the porous membrane is located directly below the open first end.

6. The method of claim 1, wherein the volume of the liposome collection container below the porous membrane is greater than the liposome suspension holding volume.

7. The method of claim 1, wherein the membrane holder has a circular cross section that is coaxial with a circular cross section of the liposome collection container.

8. The method of claim 1, further comprising a gasket sealing the membrane holder to the liposome collection container.

9. The method of claim 1, further comprising a vacuum adapter, wherein a vacuum force can be transmitted from the vacuum source to the vacuum adapter and then to the opening in the wall of the liposome collection container.

10. The method of claim 9, wherein at least a portion of the liposome collection container is located in an interior of the vacuum adapter.

11. The method of claim 1, wherein the suspension of liposomes has an average diameter of 1000 nm or more.

12. The method of claim 1, wherein the porous membrane has a pore size of 1000 nm or less.

13. The method of claim 12, wherein the porous membrane has a pore size ranging from 1 nm to 500 nm.

14. The method of claim 1, wherein the population of liposomes has an average diameter ranging from 75% to 125% of the pore size of the porous membrane.

15. The method of claim 1, wherein the membrane holder has a first dimension parallel to the porous membrane ranging from 1 cm to 10 cm and a second dimension perpendicular to the porous membrane ranging from 1.5 cm to 20 cm.

16. The method of claim 15, wherein the first dimension of the membrane holder is a diameter.

17. The method of claim 1, wherein the liposome suspension holding volume ranges from 5 ml to 500 ml.

18. The method of claim 1, wherein the liposome collection container has a first dimension ranging from 1.5 cm to 10.5 cm and a second dimension ranging from 2 cm to 21 cm.

19. The method of claim 18, wherein the first dimension of the liposome collection container is a diameter.

20. The method of claim 1, further comprising transferring the population of liposomes from the liposome collection container into a receiving container.

\* \* \* \* \*